United States Patent [19]

Lemelson et al.

[11] 4,258,387
[45] Mar. 24, 1981

[54] VIDEO TELEPHONE

[76] Inventors: Jerome H. Lemelson, 85 Rector St., Metuchen, N.J. 08840; Christian Grund, 2035 Burr Ave., Bronx, N.Y. 10461

[21] Appl. No.: 85,461

[22] Filed: Oct. 17, 1979

[51] Int. Cl.³ .......................... H04N 7/12; H04N 7/14
[52] U.S. Cl. ..................................... 358/85; 179/1 C; 179/2 C; 358/229; 358/254
[58] Field of Search .......................... 358/85, 229, 254; 179/2 C, 2 TV, 1 C, 1 HF; 360/33; D14/54, 57, 78, 79

[56] References Cited

U.S. PATENT DOCUMENTS

| D. 208,634 | 9/1967 | Janda | D14/54 |
|---|---|---|---|
| 3,515,806 | 6/1970 | Spraker | 179/1 C |
| 3,984,638 | 10/1976 | Carrouge | 179/2 TV |
| 4,071,697 | 1/1978 | Bushnell | 179/2 TV |
| 4,099,202 | 7/1978 | Cavanaugh | 358/85 |

FOREIGN PATENT DOCUMENTS 2813973  5/1978  Fed. Rep. of Germany .............. 358/85

OTHER PUBLICATIONS

C Q Magazine, Apr. 1975, pp. 25–27, 64, 66, "The Venus Scientific Slow-Scan TV Equipment".
Elektor, Sep. 1976, pp. 907, 909, "A Telephone to Television Domestic Information System".
1977 Int. Conf. of Communications, (Jun. 12–15) pp. 19.6-47-50, "An Advanced Home Terminal for Interactive Data Communication".

Primary Examiner—Howard W. Britton

[57] ABSTRACT

An apparatus and method are provided for transmitting video data over telephone lines. The apparatus is particularly applicable for transmitting and receiving images of persons speaking to each other. In one form, a portable self-contained unit is provided at each end of a conventional telephone circuit wherein the transducers of the mouthpiece and earpiece of each telephone are respectively acoustically coupled to respective acoustic output and input electrical-to-sound and sound-to-electrical transducers of each self-contained unit for two-way audio and video communication therebetween. Each unit, which may be contained in a single housing, has a television camera directed and operative for slow scanning the face of a person making the telephone call, a television display screen and image retaining means for displaying the image of a person having a similar unit at the other end of the line, and a speaker and microphone which may be contained within the housing or in a telephone hand set for receiving speech and generating sounds of speech transmitted from the other terminal circuits. Hard copy generating means, such as a picture printer, may also be provided to print pictures of the images on the television display screen when controlled to do so.

14 Claims, 5 Drawing Figures

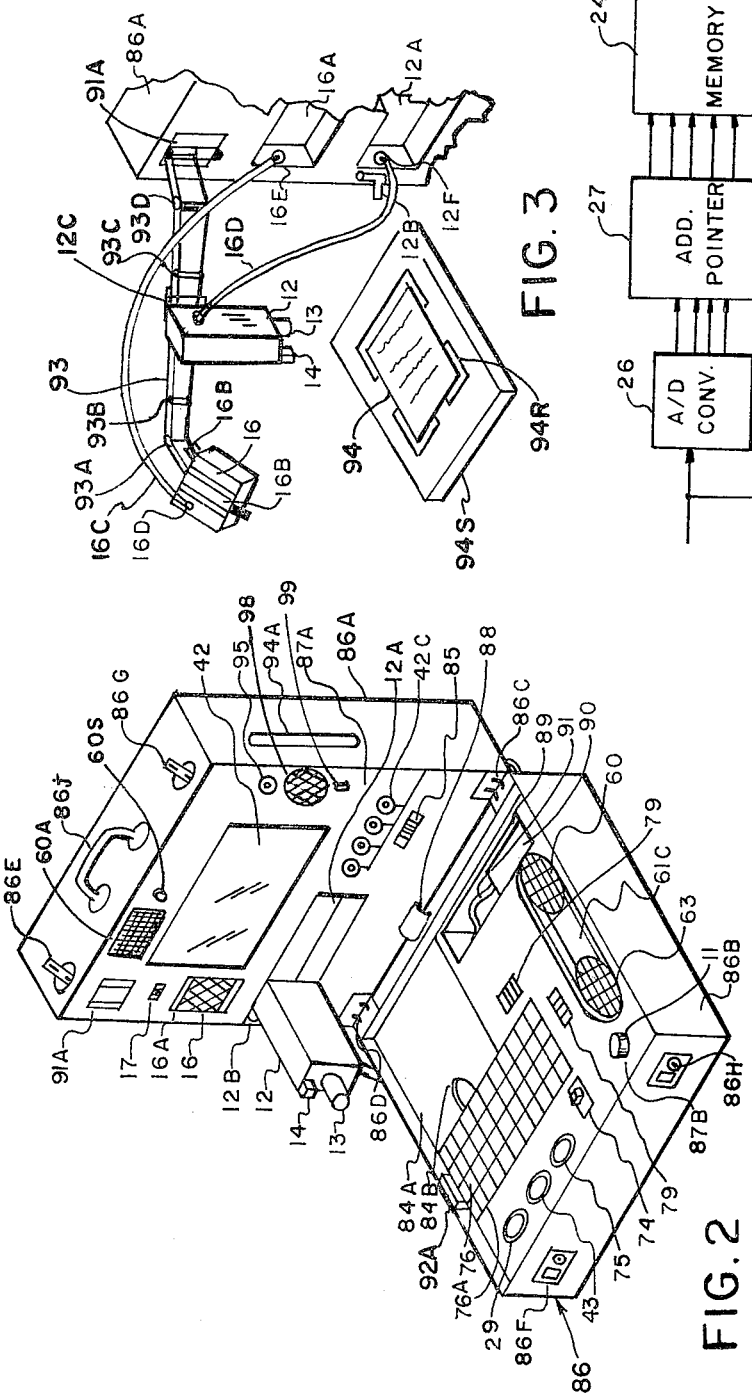
FIG. 3
FIG. 2
FIG. 4
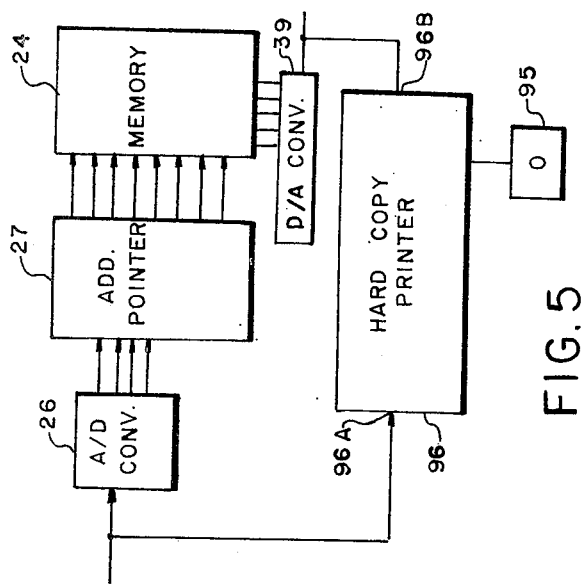
FIG. 5

VIDEO TELEPHONE

SUMMARY OF THE INVENTION

This invention relates to an apparatus and method for transmitting and displaying video data, particularly employing conventional telephone lines and conventional telephone terminal circuits at which are located conventional telephone hand sets. In particular, the system employs separate display units at the respective telephone terminal circuits between which video and audio communication is effected wherein either or both the display units is acoustically coupled to the telephone of its terminal circuit and may be operated without specially connecting same by means of direct wiring to the telephone circuit.

It is known in the art to transmit slow-scan video picture signals over telephone circuits wherein the image of the face of a person making the telephone call is displayed on a display screen, such as the face of a cathode ray tube and wherein such display may change at fixed intervals which may vary from about every ten seconds to a minute or so. Such systems have generally been prohibitively expensive for use by the general public not only as a result of their cost of fabrication but also because of their high installation cost. The instant invention is drawn to a picture telephone system employing portable units at both ends of the telephone communication link wherein installation is merely a matter of acoustically coupling the mouthpiece or microphone of a conventional telephone with a speaker of the portable unit and the earpiece or sound transducer of said telephone with a microphone associated with the portable device. Such acoustical coupling may be effected by merely placing the hand set of the conventional telephone in a receptacle provided on the housing of the portable device and, after the telephone line connection is made by dialing or push-button means, providing power to the portable device for electrically energizing the circuits thereof to display, amplify and reproduce the audio information fed thereto. By utilizing a pair of such devices, any two conventional telephone terminal circuits of a telephone system may be employed to transmit video information in two directions on the completed circuit for viewing purposes and in a particular form of the invention, the video signal from one terminal circuit to the other is transmitted in its entirety while the other's video signal generating means is deactivated and, when such transmission is complete the video signal generated by the other terminal circuit may be transmitted to the terminal circuit from which video transmission first occurred, so as to avoid interference between the two video signals on the connected line. In another form, both portions of the video signal generated on the connected circuit by a television scanner at one terminal thereof are interposed between portions generated on the connected circuit by the television scanner of the other circuit. The receiving circuits of each video display are deactivated while the receiving circuits of the other are activated.

Accordingly, it is a primary object of this invention to provide a new and improved communication system for both audio and video communication.

Another object is to provide a communication system employing one or more portable transmitting and receiving units for both audio and video signals generated both at each unit when remote from each other.

Another object is to provide a portable communication unit for transmitting and receiving information in a plurality of different forms including audio, still frame video, facsimile and digital information forms.

Another object is to provide a portable unit which is easily coupleable to a conventional telephone terminal and may be used as a television terminal for the transmission of information on a telephone line.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 2 is an isometric view of a portable unit forming part of the system defined in FIG. 1.

FIG. 3 is a partial isometric view of a modified form of the portable unit shown in FIG. 2.

FIG. 4 is a partial isometric view of a portion of the unit of FIG. 2 in an open and operable condition.

FIG. 5 is a schematic diagram of a hard copy printing sub-system associated with the system shown in FIG. 1.

Figure 1:
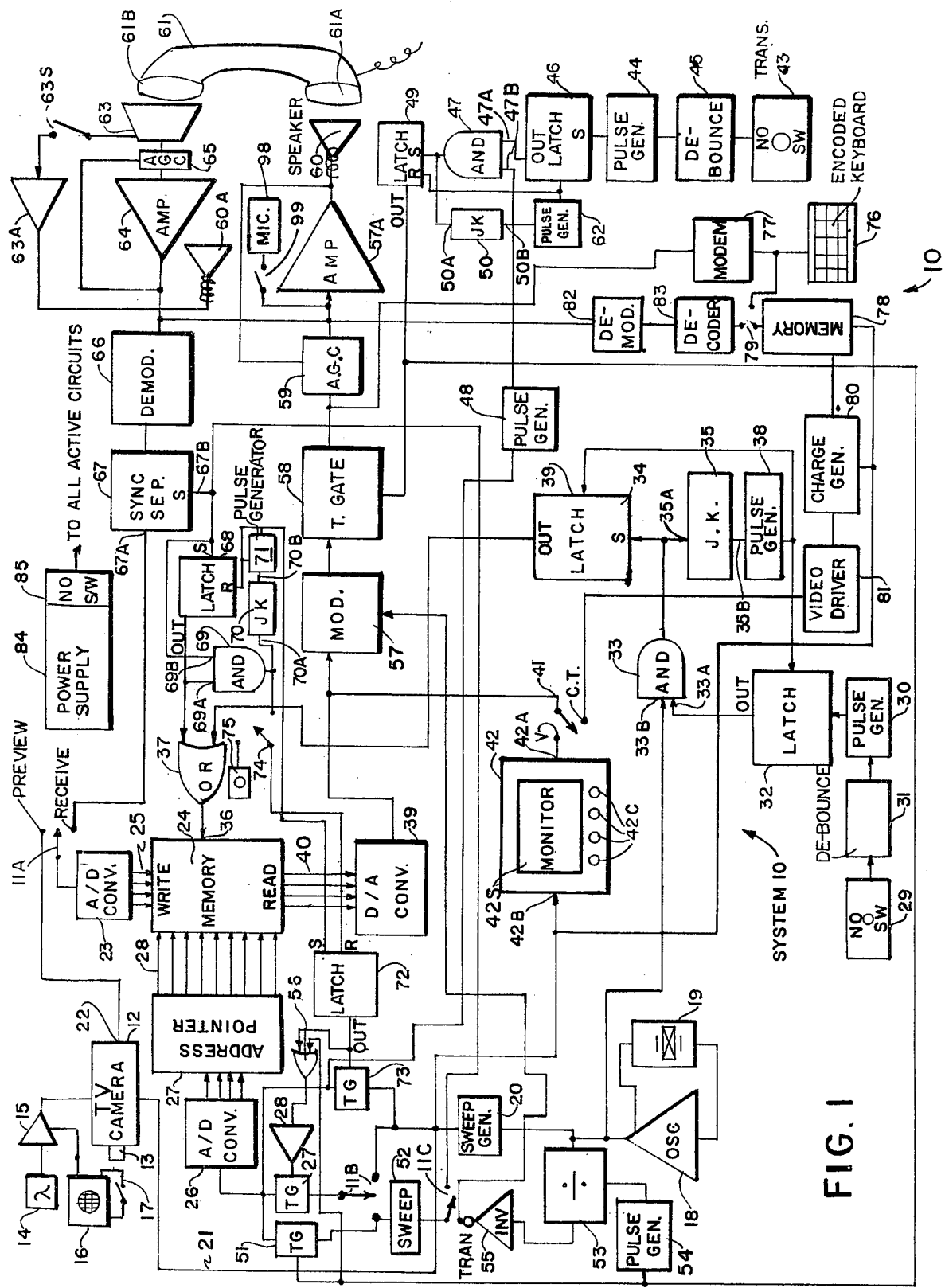
FIG. 1 is a schematic diagram of electronic and other components of a portable two way communication system for video and audio information transmittable on conventional telephone lines.

FIG. 1 illustrates a portable electronic communication device 10 which is electrically powered by a suitable power supply 84, such as a rechargeable battery, which supplies electrical energy for the various components of the system through a plurality of manually operated switches. The communication device 10 includes a television camera 12 having a lens 13 for scanning an image field, such as an image of a person located at the device and who is seeking to communicate with another person in the system by means of one or more telephone line communication channels. Control means is provided in the form of a photoelectric sensor 14, the output of which is connected to an amplifier and control circuit 15 for compensating for the ambient light level presented to the camera 12. A supplemental light source 16, such as a small photo flood lamp or other suitable lamp, may also be automatically controlled to eliminate one or more subjects in the field scanned by the camera in the event that the ambient light level falls below an acceptable level in order for the camera 12 to properly operate. The light source 16 may also be manually controlled through a manual switch 17.

Signals for controlling the read-beam of the camera 12 are initially generated by a sync oscillator 18 which, in the embodiment illustrated, is a crystal oscillator controlled by means of a suitable crystal to achieve the accuracy and stability necessary for proper camera operation. Such crystal provides the necessary synchronizatior pulses to a sweep generator 20 which produces on its output a suitable waveform which it presents to the synchronization-deflection control circuits of the camera through an input 21 extending to the camera. The video signals representing the image to be transmitted, pass through a video output 22 of the camera 12 through a switch 11A to an analog-to-digital converter 23 in which said signals are converted to digital codes representing the color and brightness levels of the image scanned by the camera 12. The coded output of the converter 23 is presented to a memory 24 through a memory Write-input port 25.

The sweep generator 20 is also connected to an analog-to-digital converter 26 through a switch 11B and a transmission gate 27, which gate is held by an inverter 28. Analog-to-digital converter 26 generates a digital code on its output, which code is a series of signals representing a sweep signal voltage, and such signals are passed to an address pointer 27 which determines the code of the particular sequential word position in the memory 24 and represents the particular pixel being scanned by camera 12, the color and brightness signals of which are simultaneously presented to the analog-to-digital converter 23. The code so generated is transmitted to the memory 24 through input ports 28.

A depression of a normally open momentary contact switch 29 causing it to close, results in the activation of a pulse generator 30 thru a debounce circuit 31, which provides a single setting pulse to a latch 32 each time the switch 29 is closed. Latch 32 activates an input 33A of an AND gate 33 having a second input 33B which is activated upon receipt of the next sync pulse which indicates the beginning of an new full-frame scanning sweep controlled by sync oscillator 18, the output of which transfers the pulse to the set input/S of a latch 34 and also activates a clock input 35A of a JK flip-flop switch 35. The Q output 35B of flip-flop 35 becomes inactive upon receipt of the first pulse by the flip-flop 35. The output of latch 34 is thereafter transferred to the write-enable input 36 of memory 24 through an OR gate 37, causing the memory 24 to "Write" the word presented at inputs 25 in the position of the memory as determined by the code generated on the address input 28 of the memory. This write or recording process continues sequentially through the memory until the next sync pulse generated by oscillator 18 is received by input 33B to the AND gate 33. Such second pulse is transferred to the clock input 35A of the flip-flop switch 35 through AND gate 33 and causes the flip-flop to toggle again. This causes the P output 35B to resume its initial state causing pulse generator 38 to generate a single short duration pulse which is applied to reset latches 32 and 34, thus deactivating the input 33A to the AND gate 33 and preventing the passage therethrough of subsequent sync pulses. The action also deactivates the OR gate 37 which controls the write enable input 36 of memory 24, thereby terminating the writing of new information in the memory. As the address pointer 27 scans memory 24, the information stored therein is sequentially presented to a digital-to-analog converter 39 through read inputs 40 of the memory 24 and is converted back to an analog video signal which represents the color and brightness levels of the pixels of the previously recorded field. The video signal, so generated, is then conducted throught a switch 41 and video input port 42A to a video receiver-monitor 42, which, upon simultaneous receipt thereby of sweep signals from sweep generator 20 through sweep input 42B, displays the reconstructed recorded image field or scene which is recorded in memory 24 for monitoring or previewing and possible cancellation before its transmission. In other words, if the picture so generated is not acceptable and is unfavorable, it may be automatically cancelled by a second operation of the switch 29, after which a new piture signal may be generated by the camera and recorded as described.

If it is determined that the image recorded in the memory is acceptable for transmission, a normally open, momentary contact transmit switch 43 is manually closed. The closure of such switch 43 activates a pulse generator 44 through a switch debouncing circuit 45, which transfers a set pulse to a latch 46. The output of latch 46 is connected to activate an input 47A to an AND gate 47. The other input 47B to the AND gate 47, is activated by a pulse received from a pulse generator 48, which is operable to generate a pulse each time the input sweep control signal transmitted to analog-to-digital converter 26 initiates a new cycle, which indicates the beginning of a frame scanning sequence. When both inputs of the AND gate 47 are energized, a pulse is transmitted on the output of said gate to the set input S of a latch 49 and also to the clock input 50A of a JK flip-flop 50, forcing its Q output 50B to be deactivated. The output of latch 49 activates a transmission gate 51 to cause the slow sweep signals generated by sweep generator 52 to be passed through such gate. Generator 52 is operated at a much slower rate than sweep generator 20 and is synchronized with the sync oscillator 18 by means of a frequency divider 53 which is reset by signals generated by a pulse generator 54 to cause the divider to count to zero in response to the signal generated on the output of latch 49 and the inverter 55. The fast sweep generator 20 is simultaneously disconnected from the converter 26 by the output of latch 49 as follows:

Latch 49 activates an OR gate 56 which, in turn, activates inverter 28, thereby deactivating transmission gate 27 stopping the passage of fast sweep signals from generator 20 through switch 11B, the output of which extends to the converter 26.

The memory 24 is thus scanned at a slow rate and its contents are read and converted to analog signals by means of the digital-to-analog converter 39 in the manner described. Such analog signals are input to a modulator 57, which combines them with the slow sync pulse received from inverter 55. The combined signals convert the composite video picture signal to a form which may be carried on ordinary telephone lines, such form being for example, an FM signal which is modulated between 400 Hertz and two Kilohertz. The output of modulator 57 is then transmitted to an amplifier 57 through transmission gate 58 and an A.V.C. circuit 59, the function of which is to maintain proper amplification and output level of amplifier 57A. The output of amplifier 57A is applied to drive a speaker 60 which is acoustically coupled to the transmitter 61A of a telephone handset 61, thereby effecting transmission of the visual image signal through the telephone system.

At the beginning of the next sweep sequence, when the entire frame in the memory 24 has been scanned, the pulse generator 48 transfers a second pulse to the input 47B of AND gate 47, which second pulse is subsequently transferred to the clock input 50A of the flip-flop switch 50, which action toggles the Q output 50B to its active state causing a pulse generator 62 to provide a reset pulse to latch 46 and latch 49, thus deactivating input 47A to the AND gate 47 and stopping the passage of subsequent sync pulses through such gate. Transmission gate 51 is also deactivated which stops the passage of slow sweep signals from the generator of 52 therethrough. An input to OR gate 56 is also deactivated, which subsequently causes the input to the inverter circuit 28 to become deactivated, thereby activating the transmission gate 27, resuming the passage of the fast sweep signals from the generator 20 to the analog-to-digital converter 26 and returning the operation of the circuits to the fast sweep mode for again displaying the contents of the memory 24 on the screen of the monitor 42 as described.

Receipt of a short wave transmitted video picture signal is accomplished as follows:

The audible signals emitted by the receiver 61B of the telephone handset 61, are picked up and converted to electrical signals by means of a microphone or any suitable transducer 63 and are conducted to an amplifier 64 via A.G.C. circuit 65, which maintains a constant volume output for amplifier 64 by varying the gain or other parameter or subsequent application to a demodulator circuit 66. The demodulator circuit 66 outputs the received and demodulated video signal to a sync separator 67. Video signal output 67A of the sync separator 67 is then input to the analog-to-digital converter 23 through a switch 11A, and converted to digital form in the manner indicated above. The sync output 67B of the sync separator 67 serves to set latch 68, the output of which is then applied to activate the input 69A of an AND gate 69 and an OR gate 37, which subsequently activates the write-enable input of memory 24 wherein operation continues as previously described. The other input 69B to the AND gate 69 is activated by the sync pulse received from the sync output 67B of the sync separator 67. When both inputs 69A and 69B are activated, such sync pulse is transferred to the clock input 70A of a JK flip-flop switch 70, toggling its Q output 70B to an inactive state.

The signal generated on the sync output 67B is also conducted through switch 11C to the slow sweep generator 52. The output of the sweep generator 52 is conducted through switch 11B and transmission gate 27 to analog-to-digital converter 26, which functions thereafter as described. The incoming video signal is thus written or recorded in the memory 24 in synchronization with the other necessary signals transmitted thereto.

On receipt of a second sync pulse which marks the end of the received frame signal, such sync pulse is processed and conducted through gate 69 to the clock input 70A of flip-flop switch 70, thus retoggling the Q output 70B of such flip-flop, to the active state and causing a pulse generator 71 to generate a pulse which is applied to reset latches 68 and 72. Latch 72, once set as described, activates an OR gate 56 which causes inverter 28 to inactivate transmission gate 27, thereby stopping the passage of the slow sweep signals from generator 52.

The output signal generated from the output of latch 72 is also applied to activate a transmission gate 73 allowing the passage of the fast sweep signals from the generator 20 to the analog-to-digital converter 26. The memory 24 is thus scanned at the fast rate with subsequent display of the frame recorded in the memory, on a monitor screen 42S as previously described, thus displaying the received information.

When the next full-frame picture signal is received, a third sync pulse is generated on output 67B of sync separator 67 which pulse is transferred to the output of AND gate 69. Such pulse is further conducted through a switch 74 to the reset input of latch 72 which, in turn, deactivates OR gate 56 causing inverter 28 to turn on or activate transmission gate 27, thus passing the slow sweep signals from generator 52 through switch 11B to the analog-to-digital converter 26. The signal generated on the output of latch 72 deactivates transmission gate 73, thus stopping the passage of fast sweep signals from the generator 20, with subsequent recording and sweep speed switching being effected as indicated above.

If manual resetting is desired, the reset input to the latch 72 is connected to a momentary contact, manually operated switch 75 through switch 74 which, when operated, will reset latch 72 with subsequent operation as described.

System 10 may also be operated with a transceiving computer terminal. Information keyed or otherwise generated by means of the selective operation of a keyboard 76, is output in coded form to a suitable modem 77 and thence to an amplifier 57A thru an AGC circuit 59, which subsequently drives speaker 60 which is acoustically coupled to handset 61 as described. The entered information is also transmitted to and recorded by a memory 78 through a switch 79 and therefrom to a character generator 80, a video driver 81 and a switch 41 to display the latter on the screen 42S of the video monitor or receiver 42.

Incoming signals received from handset 61 are converted and amplified by a microphone 63, an AGC circuit 65 and an amplifier 64. The demodulator 82 separates the incoming signals from the modulation and the connected decoder 83 converts such signals to appropriate digital form for application to memory 78 through switch 79. Subsequent thereto, character generator 80 and video driver 81 cooperate to generate video signals representative of the contents of the memory 78 by passing said signals through switch 41 for subsequent display on monitor 42, thereby displaying the received information once more. It is noted that all circuits are synchronized by sweep generator 20.

Power supply 84 supplies suitable electrical power for all its active circuits of system 10 and may comprise a battery or other source of electrical energy. A manual switch 85 connects such power supply to the circuits illustrated and deactivates such circuits when opened.

In FIG. 2 the major components of system 10 of FIG. 1 are illustrated. A self contained unit includes a housing for receiving and retaining all components of the system 10. The self contained unit includes an attache-like case 86 having a pivoted top portion 86A which is hinged to a bottom portion 86B by means of hinges 86C and 86D and is easily openable to expose the operating components of the system. Mechanical latches 86E, 86F, 86G and 86H, are provided to close the case 86 when not in use. A handle 86J is also shown and is included for ease of carrying or transport of the device.

Within the housing 86 is contained mounting panels 87A and 87B on which are supported all of the switches and controls described and defined in FIG. 1.

Additional components and features of the container 86 include a storage compartment 12A in which the television camera 12 may be stored, another compartment 16A for storing light source 16 to be used with the camera, a hinged support 12B for supporting the television camera as system 10 operates, a battery compartment including a cover 84A with a depression 84B for removing the cover allowing access to the rechargable battery, a ribbon cable 88 for connecting circuits devices located within the container with the other components indicated in the schematic diagram and a compartment 61C for containing a telephone handset, such as illustrated in the schematic diagram, in which compartment is disposed the described microphone 63 and speaker 60 in proper position to permit their coupling with the telephone handset mouthpiece and earpiece; a compartment 89 in which is stored a line cord 90 for connecting system 10 to line current, if necessary or for charging the battery 84. A television camera and light extension arm assembly 91 is stored in compartment 89. Also stored within the container 86 are folding devices 91A and 92A for cables and a keyboard 76 supported within a compartment 76A.

FIG. 3 shows an arrangement of the system 10 for transmitting facsimile information, such as document or picture signals, on telephone lines. The television camera and lamp support assembly 93, which contains swivel joints 93A to 93 D for adjusting the position of the camera, is fitted into and supported by holder 91A in a manner to support the camera 12 on the end of an arm 91 when a clip 12C, which is attached to the camera, is secured to the support. This positions the camera as directly above a support 94S for document 94. The extension 93 also supports the camera flood-light 16 when a clip 16B supported by the light socket, is attached thereto to permit the document to be properly illuminated for proper video camera scanning. An extension cord 16C extends from the recess 16A in which the light source 16 is stored, to such light source when such light source is supported at the end of jointed arm assembly 91 as shown for providing suitable electrical energy for power such light source and also contains a pluggable connector 16D at its end to connect it to the light source housing. A second extension cord and cable 16D extends from the recess 12A in which the camera 12 is stored and contains wires for supplying power to operate the television camera and transmit the camera's video output signals to the circuits shown in FIG. 1. Notations 12E and 12F refer to stress relief grommets for the cables 16C and 16D supported by the side walls of the recesses 16A and 12A. Support 94S for the document 94 to be scanned contains a prepositioning frame or stops 94R for prepositioning the document for proper scanning by the video camera 12 when the support 94S is properly located on the panel or cover 84A for the battery compartment by disposing the latter against the side walls of the compartment or container 86B. The television camera 12 may be easily detached from its hinged mount 12B as shown in FIG. 2 to permit it to be retained by its support clip 12C at the proper location on the arm 93 as shown in FIG. 3 for properly scanning a document.

In FIG. 4 is shown an operating arrangement in which the manually operable keyboard 76 is supported outside of the case or container 86 to permit easier access thereto. A holder 92A, which is attached to the rim of the bottom part 86B of the container 86 is operable to receive a holding clip 92B which is attached to the support for the keyboard 76 and to hold the keyboard thereon. Keyboard 76 is electrically connected to system 10 through an extension cord 76B which extends through grommets 76C and 76D in openings the wall portions of the keyboard support and the container 86 as shown.

FIG. 5 shows the system 10 modified or added to for the production of hard copy of information received on a connected telephone circuit from a remote location containing a similar device or from the output of camera 12 and/or the keyboard 76. A hard copy printer 96, such as a facsimile printing device of conventional design, a cathode ray tube printer, a laser line printer, ink jet printer or other device, has as inputs thereto terminals 96A and 96B extending from the sweep generator for the television camera 12 and the picture signal element generator 39, which is the described digital-to-analog converter receiving the picture information elements from the memory 24. Upon closure of a normally open switch 95, signals presented to the terminals of the hard copy printer 96 and the automatic operation of such printer will cause the printer to print and provide a hard copy of the information fed thereto, which hard copy will be delivered as a sheet from a slotted opening 96A provided in the side wall of the upper part 86A of the case or housing 86 in which is contained such hard copy printer.

In the event that it is desired to listen to conversation from the remote terminal without picking up the telephone handset 61 from its operable position in the recess 61C a speaker 60A is provided which is supported by the front panel 87A of the housing section 86A as shown in FIG. 2 and is connected through an audio amplifier 63A and a manually operated switch 63S to the micorphone 63 to which the mouthpiece or speaker 61B of the telephone handset 61 is coupled. The bistable manual switch 63S permits the operator or user of the communication device 10 to receive and listen to the voice of the person at the other end of the telephone line after the video signal has been transmitted or before such transmission without removing handset 61 from the cradle or recess 61C provided in housing section 86B. Switch 63S may also be automatically controlled or replaced by a suitable filter circuit and control to pass only audio speech signals to the speaker 60A.

Also provided and supported by the panel 87A at the front of housing member 86A is a microphone 98 which is connected to the amplifier 57A when a manually operated bistable switch 99 is closed to permit the operator of the device 10 to speak directly to a person at the other end of the connected telephone circuit without removing the headset 61 from its cradle position in the recess or cavity 61C. The microphone 98 may be filed to the panel 87A or may be connected to a length of cable to be removable from the recess in the panel in which it is seated and held by hand or on the end of an extendable support near the mouth of the person using the device 10 for communication with a person at a remote terminal circuit of the telephone system to which the device 10 is coupled.

Variations in the system 10 shown in FIGS. 1–5 of the drawings include the following:

I. The television camera 12 and/or its optical system may be pivotally or otherwise supported for multiple axis adjustment of its scanning axis. In other words the scanning axis of the camera may be adjusted in both the horizontal and vertical directions.

II. The television camera 12 may also be supported higher on the compartment 86A than illustrated. It may also be supported on a track or rod extending in the vertical direction and supported by either or both the compartments 86A and 86B, and may be adjustably moved on said track.

III. Additional support may be provided in the form of one or more brackets, slides or legs pivotally secured to the vertically extending compartment or housing member 86A for supporting it vertically on the other compartment 86B as shown in FIG. 2.

IV. One or two axis movement of the television camera 12 may be effected by the operation of one or two motors which may be locally and/or remotely controlled in their operation.

Television camera focus as well as its scanning axis may be motor controlled wherein such motors are operable from the remote telephone terminal circuit by the operator thereat transmitting suitable tone control signals on the connected line to which signals suitable tone responsive relays or the like are responsive for controlling operation of such motors, for remote control of camera focus and scanning axis location or attitude.

V. The folding or pivoted assembly of the compartments 86A and 86B may be replaced by a single right angle structure defining a keyboard horizontal portion supporting a vertical portion thereof containing the video monitor screen and the movably adjustable television camera adapted to scan either the person operating the keyboard or facing the television receiver screen and to be pivoted or employing an optical system for scanning a document disposed on a receiving portion of the horizontal portion for generating the described facsimile signals of documents on the connected telephone circuit. The described hard copy printer may be supported within wither the vertical or horizontal portions of such a structure.

VI. A data composing and automatic transmission system may be provided employing the system 10 wherein the keyboard 76 is manually operated to generate characters which are displayed on the display screen 42S of the monitor 42 as lines of characters and, when a complete page or message has been so composed, it may be automatically transmitted to the remote terminal circuit to which the telephone 61 is connected by the proper operation of switch 41 to cause the displayed information to be read by the read beam of the monitor and transmitted to the input of modulator 57 the output of which is connected as described to provide such information in a transittable form on the speaker 60 coupled to the microphone of the headset 61 of the telephone.

We claim:

1. Video-audio communication apparatus comprising in combination:
    a housing,
    first means supported by said housing for receiving and predeterminately positioning a telephone mouth-ear piece containing a microphone and speaker,
    microphone and speaker means supported adjacent said first means and located to be respectively acoustically coupled to the speaker and microphone of the telephone mouth-earpiece when predeterminately located and supported by said first means,
    a television camera secured to and supported by said housing and directed to scan and generate picture signals of an area adjacent said housing.
    means for initiating and effecting automatic control of the read means of said television camera and generating a video picture signal on the output of said camera and means for applying said video picture signal to said speaker means supported adjacent said first means whereby said speaker means is modulated by said video picture signal and generates sounds in the vicinity of the microphone defining the mouthpiece of the telephone mouth-earpiece unit supported by said first means.

2. An apparatus in accordance with claim 1 including a television receiver fixedly supported with respect to said housing adjacent said television camera, said receiver having an input connected to said microphone means supported adjacent said first means for receiving signals generated when the speaker defining the earpiece of the telephone mouth-earpiece unit supported by said first means is modulated with a video picture signal transmitted thereto on a telephone circuit connected to another terminal circuit of the telephone system on which other terminal circuit said video signal is generated.

3. An apparatus in accordance with claim 2 wherein said housing is a portable unit and said television camera and receiver are supported within said housing.

4. An apparatus in accordance with claim 3 in which said television receiver includes a viewing screen and means for generating a television image on said viewing screen and an opening in a wall of said housing exposing said viewing screen to the exterior of said housing.

5. An apparatus in accordance with claim 1 including a second speaker and a second microphone fixedly supported with respect to said housing and respectively connected to the microphone means and the speaker means located adjacent said first means to permit a person in the vicinity of said housing to listen to conversation made by a person at the other end of the telephone connection and to permit the transmission of voice signals on the connected circuit.

6. An apparatus in accordance with claim 1 wherein said television receiver includes a viewing screen and said television camera and viewing screen are disposed one above the other adjacent a wall of said housing to permit the face of a person to be scanned by said camera and the eyes of the person whose face is being scanned by said television camera to simultaneously view the viewing screen of said television receiver.

7. An apparatus in accordance with claim 6 including a speaker and microphone located immediately adjacent said camera and viewing screen and supported fixed with respect to said housing, said microphone being operatively connected to said speaker means supported adjacent said first means, said speaker being operatively connected to said microphone means supported adjacent said first means to permit two-way voice communication to be established between a person whose face is being scanned by said television camera and a person located at the other end of the telephone line.

8. An apparatus in accordance with claim 7 including amplifying means supported within said housing for the voice signal generated on the output of said microphone means supported adjacent said first means.

9. Apparatus in accordance with claim 1 wherein said television camera is pivotally supported by said housing in a manner such that its scanning axis may be variably adjusted to permit it to scan in different directions with respect to said housing.

10. Apparatus in accordance with claim 1 wherein said housing is formed of two compartments pivotally joined together with one compartment adapted to rest on a horizontal surface and the other supported thereon in a vertical attitude, said television camera being supported by said vertically extending compartment.

11. Apparatus in accordance with claim 1 wherein said housing is formed of first and second compartments, means for securing said compartments together to form a carrying case thereof, means for supporting one of said compartments at substantially right angles to the other to permit it to be supported in a substantially vertical attitude when the other compartment is supported on a horizontal surface, a television receiver including an image viewing screen and means for securing said television camera and said receiver on the compartment which is adapted to be vertically supported to permit the camera to scan the head of a person facing said vertically supported compartment and the viewing screen of said receiver to be easily viewed by said person.

12. An apparatus in accordance with claim 11, said first compartment containing said first means and adapted to be supported horizontally and a keyboard supported by said first compartment, electronic means connected to the keys of said keyboard for generating code signals representative of alphanumeric characters when the keys of said keyboard and depressed, means for displaying the data generated by the selective activation of the keys of said keyboard on the viewing screen of said television receiver and means for transducing said code signals to tone sounds on the output of said speaker means to provide said data in a transducible form for receipt by the microphone of the telephone mouth-earpiece predeterminately positioned by said first means to permit said data to be transmitted thereby to a remote telephone terminal circuit to which said telephone is connected.

13. An apparatus in accordance with claim 1 wherein said television camera is adjustably supported by said housing to permit its scanning axis to be varied and to permit it to scan the head of a person facing said housing and the face of a document supported on or adjacent said housing.

14. An apparatus in accordance with claim 1 wherein said television camera is operable to generate an analog video picture signal on its output, means for digitizing said analog picture signal, a memory for storing the digitized signals derived from a full frame video picture signal generated by said camera, means for reproducing the digital signals stored in said memory and converting same to respective sound tones in the vicinity of the microphone of the mouthpiece of the telephone mouth-earpiece supported by said first means to permit the video picture information to be transmitted on the telephone lines to a remote telephone terminal circuit to which said telephone is connected.

* * * * *